June 1, 1937. F. MACCARONE Re. 20,387
SHOE STRUCTURE
Original Filed Aug. 5, 1925 2 Sheets-Sheet 1
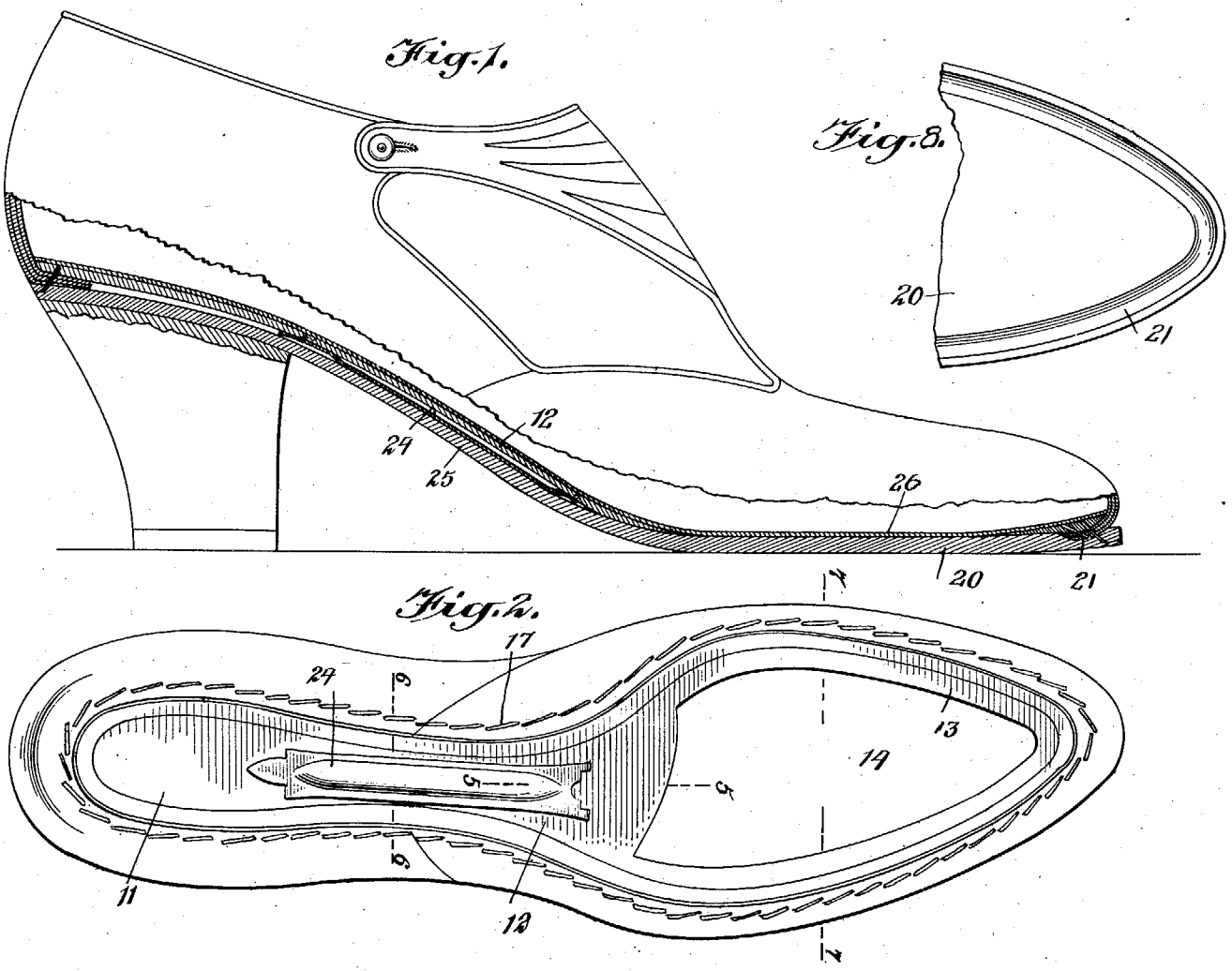
WITNESSES
Geo. W. Naylor
Hugh H. Ott
INVENTOR
Fred Maccarone
BY Munn & Co
ATTORNEYS June 1, 1937. F. MACCARONE Re. 20,387
SHOE STRUCTURE
Original Filed Aug. 5, 1925 2 Sheets-Sheet 2
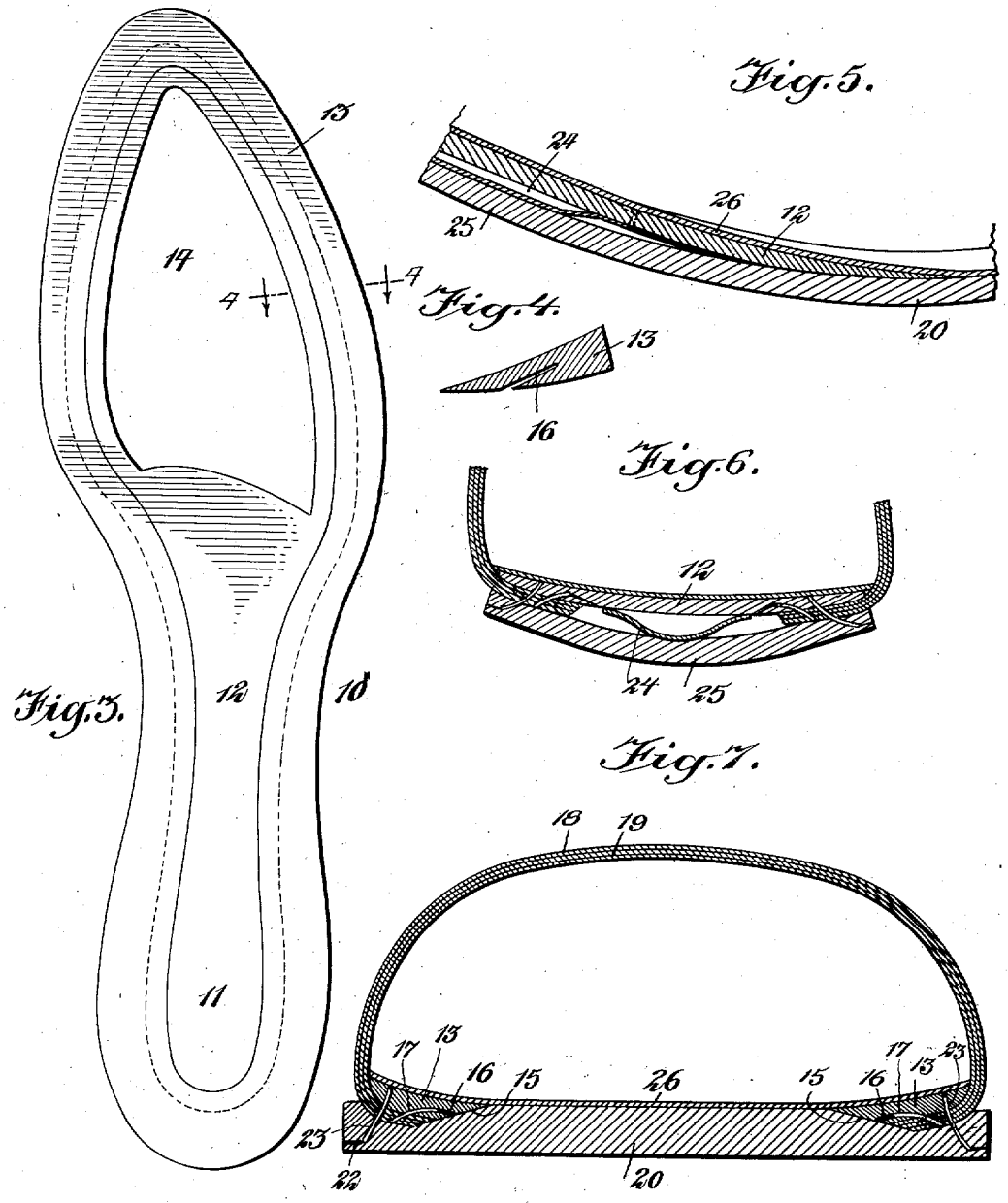
WITNESSES
Geo. M. Naylor
Hugh H. Ott
INVENTOR
Fred Maccarone
BY Munn & Co
ATTORNEYS Reissued June 1, 1937

Re. 20,387

UNITED STATES PATENT OFFICE 20,387

SHOE STRUCTURE

Fred Maccarone, Brooklyn, N. Y.

Original No. 1,569,823, dated January 12, 1926, Serial No. 48,285, August 5, 1925. Application for reissue July 1, 1936, Serial No. 88,416

7 Claims. (Cl. 36—19)

This invention relates to shoes, and particularly to certain improvements in the construction of women's shoes.

One of the principal objects of the present invention is to provide a shoe construction which, while closely simulating in appearance when finished, a turned-sole shoe, is free from many of the objectionable features incident thereto.

In the ordinary construction of what are known as "McKay" shoes, where the upper is nailed to the insole, it has been found that the filling which is arranged between the insole and the outsole, materially increases the weight of the shoe and renders the same heavy. On the other hand, the turned sole shoe has the disadvantage of the tendency of the shank to loosen, due to the fact that the inner shank and heel element which is glued in place, becomes loose within a relatively short period of time. In contradistinction to this, the present invention comprehends an inner integral shank and heel member and rand to which the upper is stitched and to which, in turn, the outsole is stitched, thereby rendering the shank rigid and immovable with respect to the upper and outsole.

The invention furthermore comprehends a shoe structure of the character set forth which when finished presents no rough exposed stitching at the juncture of the upper with the sole as is present in shoes of the turned-sole type.

The invention furthermore comprehends a shoe structure which, while closely simulating shoes of the turned-sole type, entails a considerable economy both in labor and expense; which is highly efficient in its purpose, and comparatively simple in construction.

With the above recited and other objects in view, reference is had to the following specification and drawings in which there is exhibited one example or embodiment of the invention which is in no way intended as a limitation upon the scope of the appended claims as it is to be clearly understood that variations and modifications which properly fall within the scope of said claims may be resorted to when found expedient.

In the drawings—

Figure 1 is a side view of a shoe constructed in accordance with the invention, the same being broken away and shown in section to disclose the underlying structure;

Fig. 2 is a bottom plan view of the shoe prior to the application of the outer or tread sole;

Fig. 3 is a bottom plan view of the insole prior to its attachment to the upper;

Fig. 4 is a sectional view through the rand portion thereof, taken approximately on the line 4—4 of Fig. 3;

Fig. 5 is a fragmentary longitudinal sectional view through the completed shoe, taken approximately on the line indicated at 5—5 of Fig. 2;

Fig. 6 is a transverse sectional view through the completed shoe, taken approximately on the line indicated at 6—6 in Fig. 2;

Fig. 7 is a similar view taken approximately on the line 7—7 of Fig. 2;

Fig. 8 is a fragmentary top plan view of the outer or tread sole prior to the application of the same to the insole and upper.

Referring to the drawings by characters of reference, 10 designates generally an insole, which includes an integral heel portion 11, shank portion 12, and rand 13, which rand provides, in effect, a relatively narrow marginal strip extending from the juncture of the shank of the sole of the shoe with the ball of the same, leaving an opening 14 in the insole at the ball of the shoe, the inner edges of which are skived at 15 on the under side. In said skived edges, a channel 16 is formed to receive and accommodate the stitching 17 which attaches the lower edges of the upper 18 and lining 19 to the insole. The channel 16 is continuous throughout the shank 12 and heel portion 11 for the same purpose, the upper being completely stitched to the insole, as clearly illustrated in Fig. 2.

The outsole 20 is provided adjacent the ball of the shoe, with a marginal depression 21 extending from the juncture of the shank with the ball at one side completely around the toe and to the juncture of the ball of the shank at the opposite side for the purpose of receiving and accommodating a portion of the rand with the upper stitched thereto. The outer edges of the sole are channeled at 22 to receive the stitching 23 which extends through the marginally depressed portion of the outsole, through the upper and lining and the rand 13. The usual resilient metallic shank stiffener 24 is applied between the shank portion 25 of the insole and the shank portion 25 of the outsole 20.

As will be observed, particularly with reference to Fig. 7, the inner edges of the rand 13 are acute-angled or tapered to a feather edge providing a relatively limp border section so that the under side thereof contacts at 15 for a considerable distance with the declivity which begins where the thickest portion of the outsole 20 gradually reduces the thickness of the outsole 20 in a direction toward the outer edge of said outsole. The upper is secured to the insole or rand 13 outwardly of the said feather-edged or limp portion of the edge of the rand. It will further be observed that this mating relation as between the feather-edged part of the insole rand and the sloping shoulder of the outsole at 15 is such that when the groove, depression, or reduced part of the outsole has received the rand with the upper attached thereto the central portion of the inner face of the outsole is disposed flush with the upper surface of the rand, the two parts lying and remaining in over-lapping, mating, and merging contact with each other, and that accordingly, irrespective of the thickness of the material constituting the upper and which occupies the space between the rand and the outsole, the mating relation of the rand with the outsole in a direction toward the center of the shoe is not disturbed or altered but will remain the same, whether the upper material is thicker or thinner, wrinkled at certain areas, or is constituted of a sequence of separate parts or strips, in which case there will be upper material between the rand and outsole in certain sections, while at other sections there will be no upper material at all. No matter what may be the condition with respect to the upper material, there will be no change and there can be no change with respect to the relation between the under side of the rand and the declivity of the outsole along the line 15 between the place where the upper ceases to be interposed between rand and outsole and the highest point of the declivity of the outsole.

Under this arrangement it is obvious that the assembly of the elements of the shoe may be accomplished without the necessity of turning the same as in the "turned-sole" form of shoe, and while all the virtues of the "turned-sole" form of shoe are present in the improved construction, many of the objectionable features and disadvantages incident thereto are eliminated, in addition to reducing the labor, time, and expense incident to the manufacture of "turned-sole" shoes. After the upper, insole, and outsole are assembled, the usual sole lining 26 is applied.

What is claimed is:

1. A shoe structure including an upper, an outsole, and an insole consisting of a heel portion, a shank portion, and a marginal rand integral with the forward end of the shank portion and having a skived inner edge, said edge and the under side of the shank and heel portions having a continuous channel, stitching extending through the channel and connecting the upper to the insole, and stitching extending through the outsole, the upper, the rand and the shank and heel portions of the insole.

2. In a shoe structure, an upper, an outsole, and an insole consisting of an integral heel portion, shank portion and ball portion having an opening centrally thereof defining a continuous marginal rand extending from the front of one side of the shank around the toe to the front of the opposite side of the shank, said rand having skived inner edges, the said skived inner edges of the rand and the under side of the shank and heel portions having a continuous channel, the lower edges of the upper being turned under the insole, and stitching extending through the channel in the insole and the inturned edges of the upper for connecting the insole and upper, and the outsole having its ball portion provided with a recess or groove parallel to the margin for receiving the rand and inturned stitched edges of the upper, whereby the upper face of the ball portion of the outsole is disposed substantially flush with the upper face of the rand.

3. In a shoe structure, an upper, an outsole, and an insole consisting of an integral heel portion, shank portion and ball portion having an opening centrally thereof defining a continuous marginal rand extending from the front of one side of the shank around the toe to the front of the opposite side of the shank, said rand having skived inner edges, the said skived inner edges of the rand and the under side of the shank and heel portions having a continuous channel, the lower edges of the upper being turned under the insole, stitching extending through the channel in the insole and the inturned edges of the upper for connecting the insole and upper, the outsole having its ball portion provided with a recess or groove parallel to the margin for receiving the rand and inturned stitched edges of the upper, whereby the upper face of the ball portion of the outsole is disposed substantially flush with the upper face of the rand, and stitching extending through the outsole, the inturned edges of the upper and the rand.

4. In a shoe structure, an upper, an outsole, and an insole consisting of an integral heel portion, shank portion and ball portion having an opening centrally thereof defining a continuous marginal rand extending from the front of one side of the shank around the toe to the front of the opposite side of the shank, said rand having skived inner edges, the said skived inner edges of the rand and the under side of the shank and heel portions having a continuous channel, the lower edges of the upper being turned under the insole, stitching extending through the channel in the insole and the inturned edges of the upper for connecting the insole and upper, and the outsole having its ball portion provided with a recess or groove parallel to the margin for receiving the rand and inturned stitched edges of the upper, whereby the upper face of the ball portion of the outsole is disposed substantially flush with the upper face of the rand, stitching extending through the outsole, the inturned edges of the upper and the rand, and a shank stiffener interposed between the shank portions of the insole and outsole.

5. As a new article of manufacture, an insole for shoes including integral heel, shank, and ball portions, the ball portion having a central opening therein defining a continuous marginal rand extending from the front of one side of the shank around the toe to the front of the opposite side of the shank, the said rand having a skived inner edge and said skived edge of the rand and the under side of the shank and heel portions having a continuous channel for the reception of stitches to initially connect the lower edges of the upper with the insole.

6. In a shoe structure, an insole including an integral heel portion, shank portion and ball portion, said ball portion having an opening therethrough centrally thereof, the margins of said opening being tapered to a feather-edge to provide a relatively limp border section, an upper underlying the insole altogether outwardly of said limp border section, and an outsole having its margins reduced about the ball portion for receiving the insole with the upper attached, the unreduced central ball area of the outsole meeting with the marginally reduced portions thereof on an angle to define a long sloping shoulder, the said relatively limp border section of the insole lying in overlapping, mating, and merging contact against the said sloping shoulder of the outsole, whereby the upper surface of the insole is disposed flush and smooth with the upper surface of the outsole, notwithstanding that the upper may be thick or thin.

7. A shoe comprising an outsole having a marginally reduced forepart, the reduced portions thereof meeting with the unreduced portions on an angle to define a long sloping shoulder, an insole including an integral heel portion, shank portion and ball portion, said ball portion having an opening centrally thereof, the margins of said opening being skived on a long angle and lying in lapping and merging contact against said shoulder over a considerable cross-sectional area, an upper extending between said insole and outsole altogether outwardly of said area, whereby the upper surface of the insole is disposed flush with the central upper surface of the outsole notwithstanding that the upper may be thick or thin, and means securing the parts in assembled relation.

FRED MACCARONE.